US00RE41038E

(19) United States
(12) Reissued Patent
Tsai et al.

(10) Patent Number: US RE41,038 E
(45) Date of Reissued Patent: Dec. 15, 2009

(54) SECURING DEVICE FOR TRANSPARENT DOCUMENTS IN A FLATBED SCANNING SYSTEM

(76) Inventors: Jenn-Tsair Tsai, 11F, No. 25, Ting-Liao Lung-Yuan Burg, Pa-Li, Taipei County (TW); Chieng-Ming Tsaur, 1F, No. 8, Alley 1 Lane 158 Changchun St, Hsinchu City (TW); Bill Chen, 2F, No. 6, Peiying St., Hsinchu City (TW)

(21) Appl. No.: 11/262,556

(22) Filed: Oct. 28, 2005

Related U.S. Patent Documents

Reissue of:
(64) Patent No.: 6,637,897
Issued: Oct. 28, 2003
Appl. No.: 10/233,684
Filed: Sep. 4, 2002

U.S. Applications:
(63) Continuation of application No. 09/586,566, filed on Jun. 2, 2000, now abandoned.

(51) Int. Cl.
*G03B 21/14* (2006.01)

(52) U.S. Cl. ..... 353/120; 353/97; 353/DIG. 5; 40/705; 40/701

(58) Field of Classification Search ..... 353/104, 353/120, 22, 23, 95; 40/361, 362, 704–710, 40/771, 772, 777
See application file for complete search history.

(56) References Cited

U.S. PATENT DOCUMENTS

| | | | | | |
|---|---|---|---|---|---|
| 4,467,541 | A | * | 8/1984 | Pettersson | 40/705 |
| 4,477,991 | A | * | 10/1984 | Drevitch et al. | 40/705 |
| 4,980,781 | A | * | 12/1990 | Yamamoto et al. | 358/474 |
| 5,285,237 | A | * | 2/1994 | Parulski et al. | 355/75 |
| 5,392,548 | A | * | 2/1995 | Truc et al. | 40/705 |
| 5,546,144 | A | * | 8/1996 | Lam et al. | 353/120 |
| 5,685,626 | A | * | 11/1997 | Inaba | 353/120 |
| 5,814,809 | A | * | 9/1998 | Han | 250/208.1 |

* cited by examiner

*Primary Examiner*—William C Dowling
(74) *Attorney, Agent, or Firm*—Perkins Coie LLP

(57) ABSTRACT

A transparent document securing device, using in a flatbed scanner, includes a securing frame. The securing frame comprises at least a securing cell, wherein the securing cell further includes a concave, a cover and a clip mechanism. The concave includes a least a first opening and an open slot. The cover includes at least a second opening. The securing device employs the cover to mount a transparent document in a concave. A user is therefore be able to place the securing device along with the transparent document in the document glass of a scanning system. By a predetermined mode, the scanning system is able to directly scan the transparent document; no need to preview the scanned image to adjust the scanning area. Thus, the time for scanning is saved. Further the fixed depth of the concave is utilized to proved a precise focus of the scanning system. The quality of the scanned image is therefore improved.

23 Claims, 5 Drawing Sheets

PRIOR ART

PRIOR ART

SECURING DEVICE FOR TRANSPARENT DOCUMENTS IN A FLATBED SCANNING SYSTEM

Matter enclosed in heavy brackets [ ] appears in the original patent but forms no part of this reissue specification; matter printed in italics indicates the additions made by reissue.

This application is a continuation of Application Ser. No. 09/586,566 filed Jun. 2, 2000, now abandoned.

BACKGROUND OF THE INVENTION

1. Field of the Invention

The present invention generally relates to an apparatus for mounting transparent documents. Specifically, the present invention is a securing device for securing a transparent document during scanning processes in a flatbed scanner.

2. Background Description

Nowadays flatbed scanners are fully developed computer accessories available on the consumer market. The flatbed scanner can scan colorful documentation and black-white documentation into computer files in order to preserve ordinary images or pictures. The flatbed scanner can also scan particular transparent documents, such as slides or films, by changing the light path from other direction. The transparent scanning operation can be well done in the same manner as ordinary scanning operation.

In the operation for scanning general colorful or black-white documents, the sizes of the documents usually are regular sizes, such as A4, A3, Letter or B5. The flatbed scanner is therefore comprising a document glass for positioning an original document to be scanned. Thus, for the regular sizes, the user simply follows the instructions, such as placing the original document to a predetermined position of the document glass of the scanner, selecting a corresponding size of the original document, and setting parameters of the scanning conditions in a driver program. The scanner will scan the original document by the settings. The scanner is therefore able to scan different documents by acquiring different settings.

However, in case of scanning transparent documents, for examples films, the sizes of transparent documents are regulated but differing from A3, A4, B4, or Letter size. Actually, the sizes of slides are much smaller than the area of the document glass. Thus, the users can scan several transparent documents at one time in order to save scanning time. Problems are occurring by this kind of operation. The user is usually unable to align several transparent documents on the document glass. Therefore, referring to FIG. 1, it is necessary to preselect the positions of each transparent document from the selection feature provided by the driver program, before main scanning process. By this preselection, the scanner can scan the transparent documents. Nonetheless, the auxiliary process of preselecting transparent documents from the driver program consumes the operation time and causes user's inconvenience.

To solve the above-mentioned problem, a driver software implementing an automatic transparent document locating feature is available on the market. However, it still takes lots time to locate and scan the transparent documents. Because the sizes of transparent documents are regulated, it is still not efficient if a process of preselecting transparent documents' location is needed.

Thus, there is a locating device provided for scanning original objects which have regulated sizes, for example, transparent documents. The locating device is provided for the scanning process in a flatbed scanner. Referring to FIG. 2, the locating device 2 comprises a frame 22 and at least one opening 23. First, the frame 22 is positioned on the document glass 13. Next, transparent documents are placed in the opening 23 (transparent documents not shown) in order. After placing down the cover 12, start the scanning program by a predetermined scanning mode. The scanned images are then acquired.

The frame 22 of the locating device is usually made by soft plastic material. There are several openings as the similar size of transparent documents. However, there is not featured any fixation mechanism in the mentioned locating device. Therefore, the locating device cannot provide precise positions of transparent documents during scanning. Moreover, even though the size of transparent documents is regulated, the thickness of the frame of the transparent documents will vary in different framing brands. The variant thickness of the transparent document frames will cause diffusion of the scanned image because the scanner cannot precisely focus on transparent documents which have different thickness.

In Taiwan Utility Patent (Republic of China Utility Patent) No. 294,428, there is disclosed a fixation device. Once a frame holds several transparent documents, the frame is placed into a holding member. The holding member is then inserted to a dedicated scanner for transparent scanning process. Thus, the holding member needs an upper and a lower portions for holding the frame. In addition, the dedicated scanner must implement a particular apparatus in order to scan transparent documents via a particular method. This operation is too complicated and inconvenient to the user. In addition, because the transparent document is only secured by one clip, the transparent document is able to slip to another position. It causes differences between the actual transparent document position and predetermined position in the driver program. The actual transparent document position therefore cannot be acquired. Further, the focus of the scanner cannot be precisely achieved since the transparent documents are not fully secured in a predetermined position and at a fixed height.

SUMMARY OF THE INVENTION

It is therefore an object of the present invention to provide an apparatus for securing transparent documents on a scanning system in order to acquire precise quality of scanned images.

According to the present invention, the securing cell includes a concave for containing transparent documents such as a film. Besides, there is a cover able to close the concave in order to fix the transparent documents. The scanner is able to directly scan the transparent documents by a predetermined scanning mode in order to save scanning time. Further, the present invention secures transparent documents at a fixed height. The scanner can scan transparent documents by a fixed focus. The scanning quality is therefore improved.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The following shows further description of the best mode of the present invention.

Figure 1:
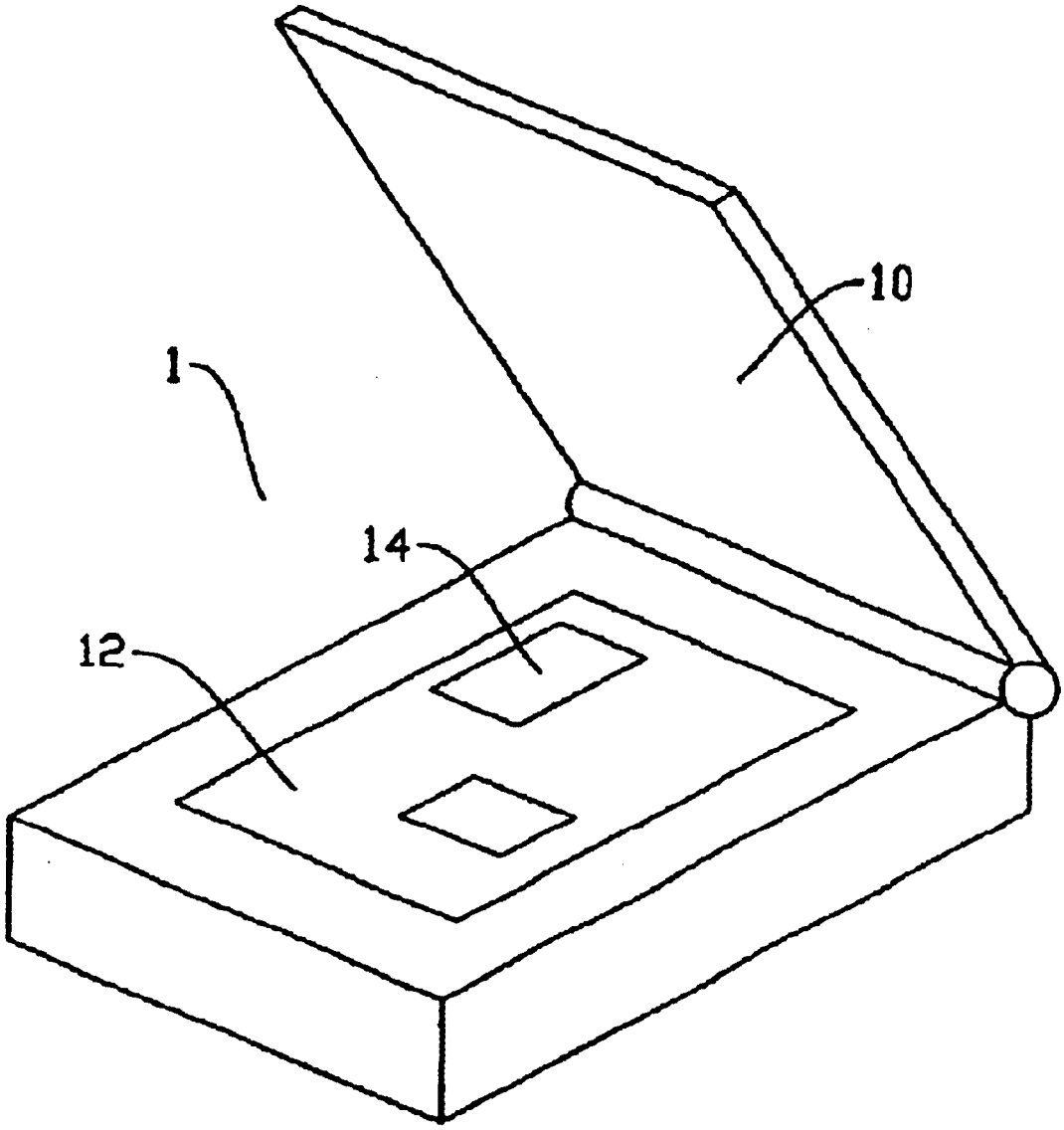
FIG. 1 is a general scheme of prior transparent document scanning process.
Figure 2:
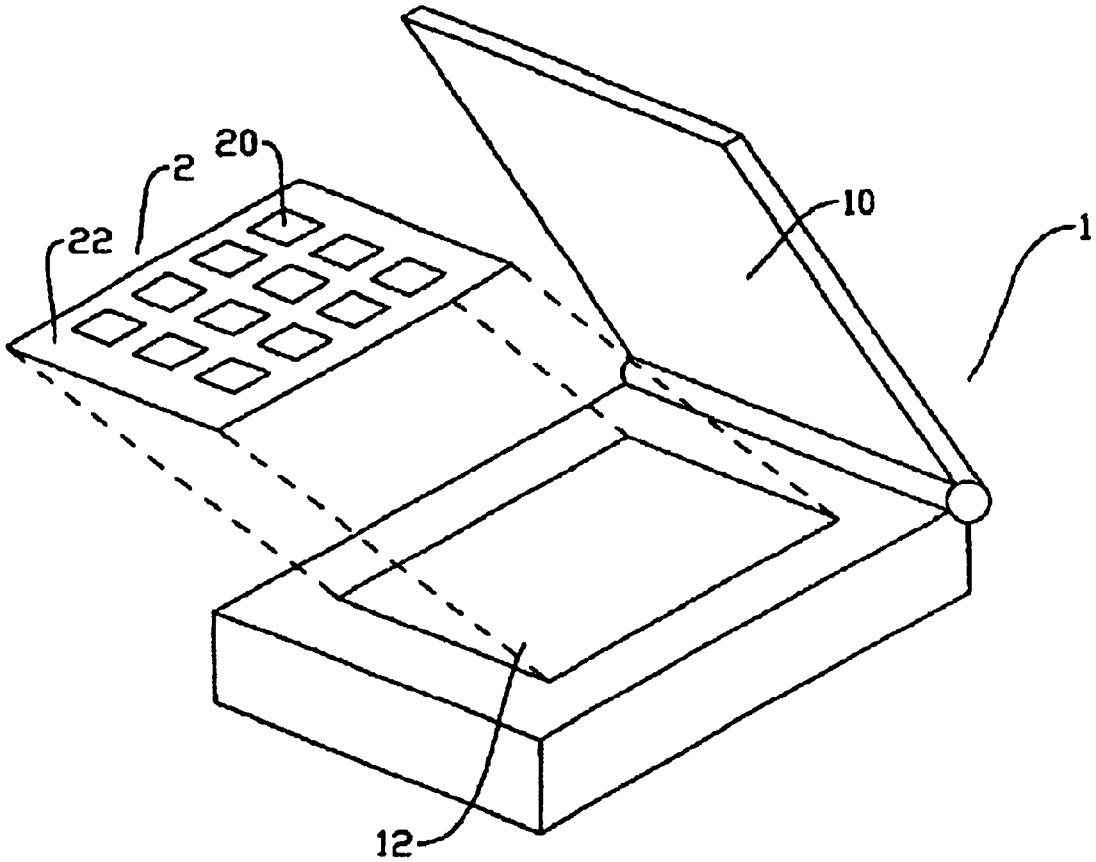
FIG. 2 is another transparent document scanning process of prior art.
Figure 3A:
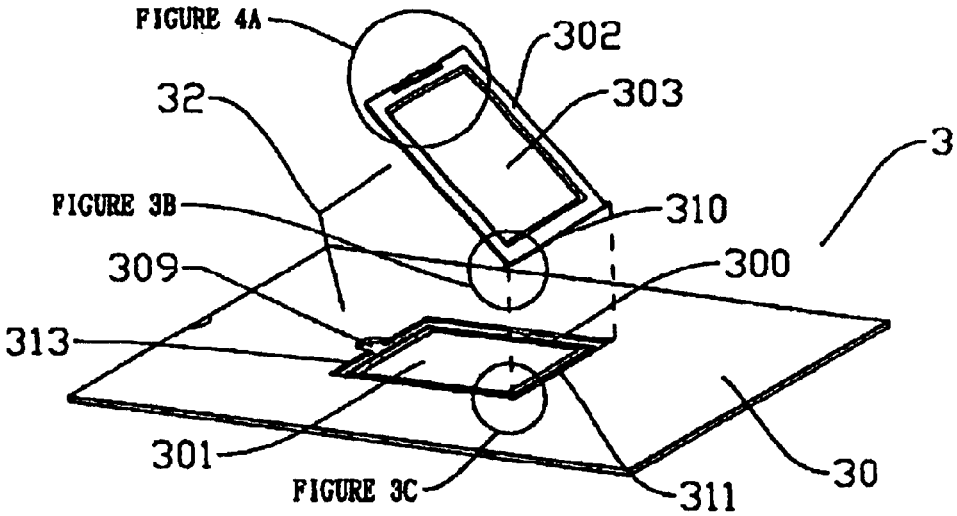
FIG. 3A shows the assembly of the cover and the concave of the present invention.

Please referring to FIG. 3A, there is shown the transparent document securing device 3 for securing transparent documents on the document glass of the flatbed scanner. The transparent document securing device 3 includes a frame 30 and at least one securing cell 32 which is located in the frame 30. The frame 30 can be placed on the document glass of the flatbed scanner, as the convention method illustrated in FIG. 2. The securing cell 32 comprises a concave 300 and a cover 302. The concave 300 is larger than a transparent document (not shown in FIG. 3A). Therefore, the transparent document can be placed in the concave 300. The concave 300 further comprises a first opening 301 which is smaller than the transparent document such as a regulated size of a film. Usually, the first opening 301 is positioned in the central portion of the concave 300. During the scanning process, the light can be projected through the first opening 301. The cover 302 further comprises a second opening 303. The second opening 303 is smaller than the transparent document. Usually, the second opening 303 is positioned at the central portion of the cover 302. The area of the second opening 303 is same as the area of the first opening 301 in order to let the light passing through. When the cover 302 flaps to the concave 300, the first opening 301 and the second opening 303 are aligned. In this case, the light will pass through the transparent document to reflect the image of the transparent document.

Figure 3B:
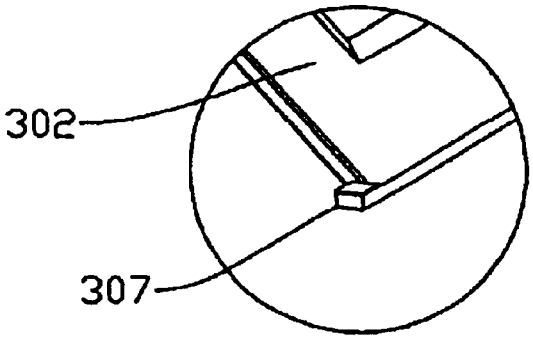
FIG. 3B shows the protrusion of the present invention.
Figure 3C:
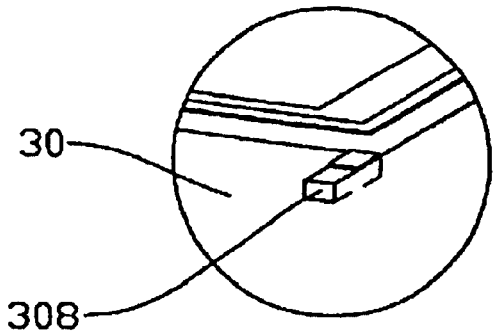
FIG. 3C shows the hole for the protrusion of the present invention.

On the other hand, please refer to FIGS. 3B and 3C, in order to open and close the cover 302 in the concave 300, the cover 302 contains two protrusions 307 in the first side 310. There are also two holes 308 in the first side 311 of the concave 300. The protrusions 307 of the cover 302 can be placed in the holes 308. Therefore, the first side 310 of the cover 302 can contact linearly with the first side 311 of the concave 300. Thus, the cover 302 can rotate along the first side 310 as an axis in the concave 300.

Figure 4A:
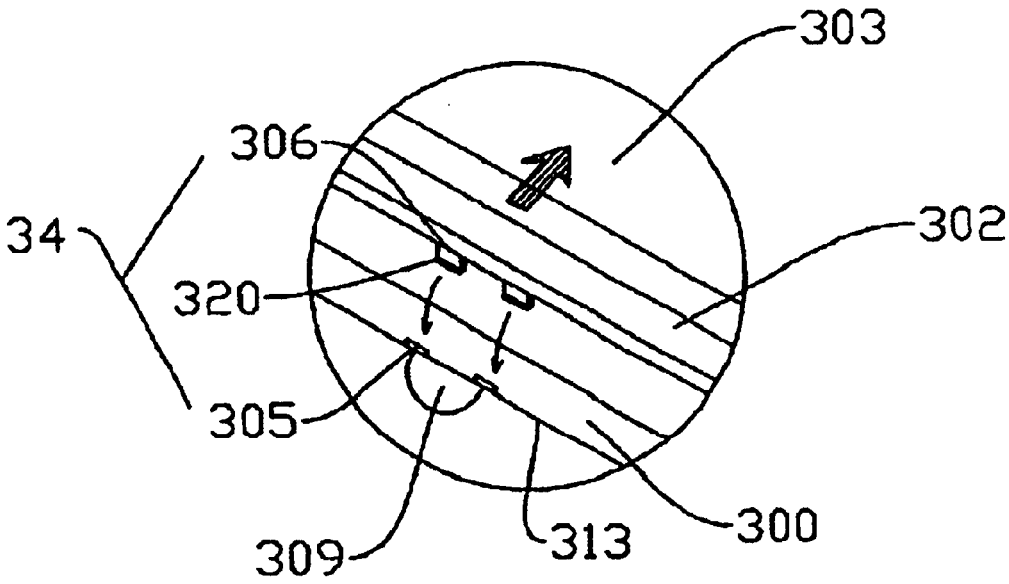
FIG. 4A shows the mounting clip and the mounting slot of the present invention.
Figure 4B:
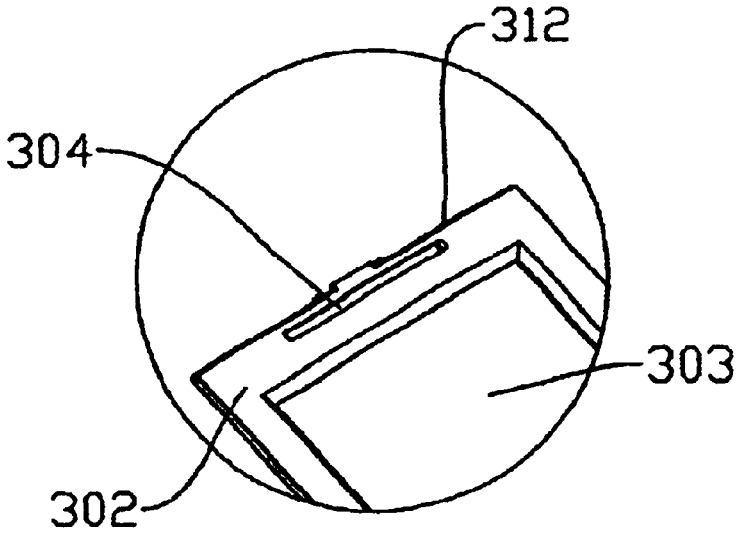
FIG. 4B shows the enlarged diagram of the cushion aperture of the present invention.

When the cover 302 closes at the concave 300, it would be better that the cover 302 can mount on the concave 300. Please refer to FIGS. 4A and 4B, the present invention shows an embodiment to the mounting issue of the cover. FIG. 4A demonstrates a mounting clip and a mounting slot. FIG. 4B shows the cushion aperture. The cover 302 includes a mounting clip 306. The mounting clip 306 extends along the surface of the cover 302 perpendicularly. The concave 300 also includes a mounting slot 305 for receiving the mounting clip 306. The mounting clip 306 is made by elastic material. Therefore, when the cover 302 closes at the concave 300, the mounting clip 306 will click on the mounting slot 305 smoothly. The tip 320 of the mounting clip 306 will hook on the mounting slot 305. In this case, the cover 302 is therefore mounted on the concave 300. When the users remove the transparent document from the concave 300, the cushion aperture 304 is further employed. The cushion aperture 304 is located on the second side 312 of the cover 302. Thus, the second side 312 is parallel elastic along the cover 302. In this case, the mounting clip 306 is elastic. When the cover 302 is opened, the user can enforce the second side 312 slightly moved to the cover 302. The mounting clip 306 will therefore be moved slightly. Then the tip 320 of the mounting clip 306 will be released from the mounting slot 305. The cover 302 is able to be opened and the transparent document is able to be removed.

On the purpose of the convenient usage to open the cover 302, the concave 300 further includes an open slot 309. The open slot 309 is located on the second side 313 of the concave 300. The purpose of the open slot 309 is for putting user's finger in the slot to enforce the second 312 of the cover 302 to the direction of the cover 302. The cover 302 is therefore easily removed to take the transparent document out of the concave 300.

Figure 5A:
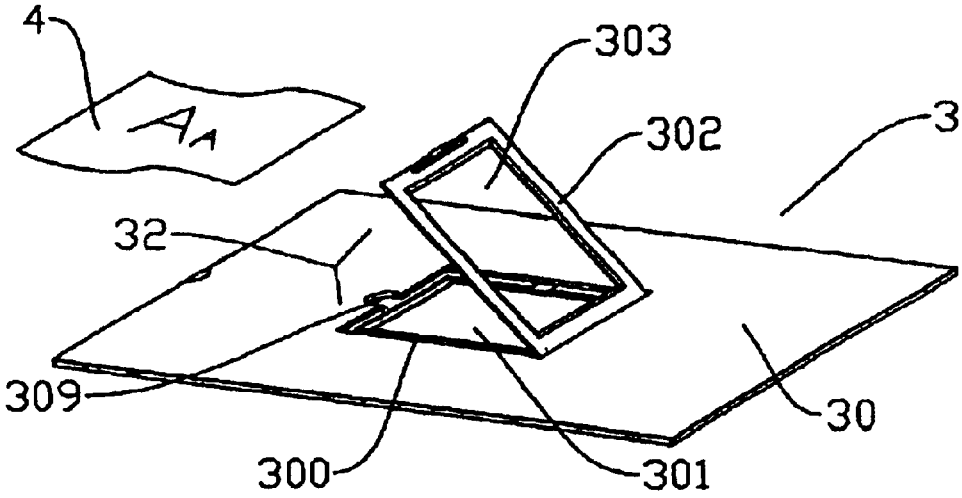
FIG. 5A shows the open status of the cover of the present invention.
Figure 5B:
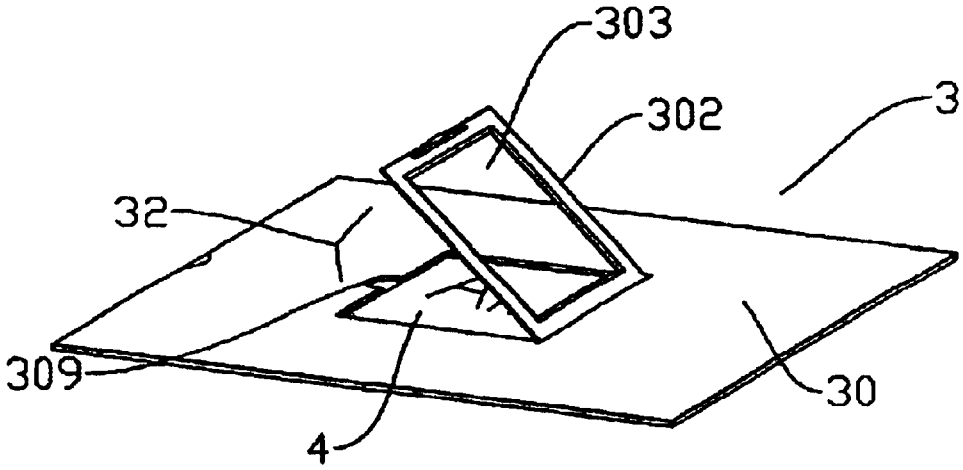
FIG. 5B shows the transparent document being placed into the concave of the present invention.
Figure 5C:
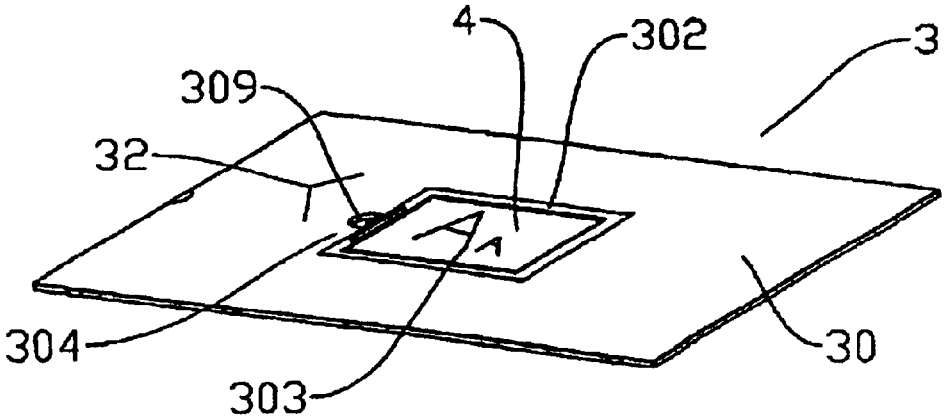
FIG. 5C shows the close status of the cover of the present invention.

For the detailed description of the present invention, please refer to FIGS. 5A, 5B and 5C. FIGS. 5A, 5B and 5C show the precesses of inserting a transparent document into a securing device, wherein the transparent document 4 could be a film, a regulated slide (such as A4, A5 or B5 sizes) or any document which the light can go through. However, the securing cell 32 is selected to match the size of the transparent document 4. If the size of the transparent document is much smaller than the securing frame 30, there could be implemented many securing cells 32 in one securing frame 30. The concave 300 of the securing cell 32 should be larger than the transparent document 4. However, the first opening 301 of the concave 300 should be smaller than the transparent document 4. The first opening 301 of the concave 300 should be large enough to let the light be transmitted through. After placing the transparent document 4 in the concave 300, the user can close the cover 302. A clip mechanism 315 is employed to secure the cover 302 in the concave 300. In this case, the transparent document 4 is also mounted in the concave 300. Therefore, the user directly places the securing device 3 in the document glass of a scanning machine. Further the scanning is processed by a predetermined mode. Moreover, the scanning mode is adjusted by referencing the depth of the concave 300 of the securing cell 32 in order to obtain a clear and precise scanning result.

In consideration of the convenient usage of the securing device 3, the securing frame 30 could be designed the same size as the document glass, such as shown in FIG. 2. The user can easily place securing frame 30 on the document glass of a scanner. In this concern, the misplacement of the securing frame 30 would be avoided and the scanner would scan right positions of the transparent documents.

Moreover, when the whole securing device along with the transparent document is placed on the document glass, in order to avoid that the thickness of the securing device is too large and therefore the cover of the scanner can be closed, the thickness of the cover 302 is usually not larger than the sums of the depth of the concave 300 and the general thickness of the transparent document. Thus, when the cover 302 is closed, the above mentioned problem will not occur. The securing device 3 can be molded as one piece to reduce the cost and processes of manufacture. By this way, the cost is down and the manufacturing steps are simplified to benefit the competition on the market.

Although preferred embodiments of the present invention have been described in the forgoing description and illustrated in the accompanying drawings, it will be understood that the invention is not limited to the embodiments disclosed, but is capable of numerous rearrangements, modifications, and substituting of parts and elements without departing from the spirit and scope of the invention. Accordingly, the present invention is intended to encompass such rearrangements, modifications, and substitutions of parts and elements as fall within the scope of the appended claims.

What is claimed is:

1. A securing device for transparent documents in a scanning system, comprising:

a securing frame, placed on a document glass of a scanner; and a securing cell, formed in said securing frame, comprising, a concave having a larger size than the size of a transparent document in order to contain said transparent document in said concave, wherein said concave further comprises a first opening having a smaller size than the size of said transparent document, and a cover, wherein a first side of said cover linearly contacts a first side of said concave in order to let said cover be able to close said concave, said cover further comprising a second opening, wherein the area of said second opening is smaller than the area of said transparent document.

2. The securing device of claim 1, wherein the size of said frame is same as the size of said document glass.

3. The securing device of claim 1, wherein said securing cell further comprises:

a clip mechanism, located on a second side of said concave and a second side of said cover, the second side of said cover opposite to the first side of said cover, the second side of said concave opposite to the first side of said concave, wherein said cover can be mounted on said concave by said clip mechanism when said cover is closed in said concave.

4. The securing device of claim 3, wherein said clip mechanism comprises:

a mounting clip, located on the second side of said cover, wherein the second side of said cover is opposite to the first side of said cover, the extending direction of said mounting clip being perpendicular to the surface of said cover; and a mounting slot, located on the second side of said concave, wherein the position of said mounting slot is the same as the position of said mounting clip when said cover closes on said concave in order to mount said mounting clip on said mounting slot.

5. The securing device of claim 3, wherein said clip mechanism further comprises:

a cushion aperture, located on the second side of said cover, for providing an elastic force in a parallel direction of the surface of said cover.

6. The securing device of claim 1, wherein the side of said cover is smaller than the size of said concave, the thickness of said cover is less than the thickness of said concave in order to make the surface of said cover the same as the surface of said concave when said cover is closed in said concave.

7. The securing device of claim 1, wherein the area of said first opening is same as the area of said second opening; the position of said first opening is same as the position of said second opening.

8. The securing device of claim 1, wherein said concave comprises:

an open slot, located on the second side of said concave, the second side of said concave being opposite to the first side of said concave, for convenient usage of opening said cover from said concave.

9. The securing device of claim 1, wherein said securing frame and securing cell are made in one piece during manufacture.

*10. An apparatus for securing a transparent document on a document glass in a scanning system, the apparatus comprising:*

*a securing frame configured to be placed on the document glass; and*

*a securing cell in the securing frame, the securing cell including*

*a concave for receiving the transparent document; and*

*a cover configured to close over the concave and secure the transparent document in the concave, wherein the cover pivots about an inner edge portion of the concave to close over the concave.*

*11. The apparatus of claim 10 wherein the securing frame is at least approximately the same size as the document glass.*

*12. The apparatus of claim 10 wherein the securing cell further includes a clip mechanism for securing the cover over the concave.*

*13. The apparatus of claim 10 wherein the securing cell further includes a clip mechanism for securing the cover over the concave, the clip mechanism including*

*at least one mounting clip carried by the cover; and*

*at least one mounting slot carried by the securing frame, wherein the mounting slot receives the at least one mounting clip.*

*14. The apparatus of claim 10 wherein the securing cell further includes a cushion aperture for cushioning at least a portion of the cover on the securing frame.*

*15. The apparatus of claim 10 wherein the cover has an area that is smaller than an area of the concave, and wherein the cover has a thickness that is less than a depth of the concave.*

*16. The apparatus of claim 10 wherein the securing frame and the concave form a unitary structure.*

*17. A scanning apparatus, comprising:*

*a frame for supporting a transparent document in a scanning system during scanning;*

*means for receiving the transparent document in a recessed opening in the frame, wherein the receiving means is carried by the frame; and*

*means for securing the transparent document within the opening, wherein the securing means rotates about an inner edge portion of the opening.*

*18. The apparatus of claim 17, further comprising a document glass member for receiving the frame, wherein the frame has an area that is at least approximately the same size as an area of the document glass member.*

*19. The apparatus of claim 17, further comprising means for releasably attaching the securing means over the opening.*

*20. The apparatus of claim 17, further comprising means for releasably attaching the securing means over the opening, wherein the releasably attaching means includes*

*at least one mounting clip; and*

*at least one mounting slot for receiving the at least one mounting clip, wherein the at least one mounting clip engages the at least one mounting slot.*

*21. The apparatus of claim 17, further comprising means for cushioning the securing means against at least a portion of the frame.*

*22. The apparatus of claim 17 wherein the securing means has a size that is smaller than a size of the recessing means, and the securing means has a thickness that is less than a depth of the opening.*

*23. The apparatus of claim 17, wherein the supporting means and the receiving means form a unitary structure.*

* * * * *